US010584759B2

(12) United States Patent
Baltes

(10) Patent No.: US 10,584,759 B2
(45) Date of Patent: Mar. 10, 2020

(54) BELLOWS ACCUMULATOR, IN PARTICULAR PULSATION DAMPER

(71) Applicant: HYDAC TECHNOLOGY GMBH, Sulzbach/Saar (DE)

(72) Inventor: Herbert Baltes, Losheim (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 0 days.

(21) Appl. No.: 15/755,156

(22) PCT Filed: Aug. 12, 2016

(86) PCT No.: PCT/EP2016/001389
§ 371 (c)(1),
(2) Date: Feb. 26, 2018

(87) PCT Pub. No.: WO2017/045739
PCT Pub. Date: Mar. 23, 2017

(65) Prior Publication Data
US 2018/0245656 A1    Aug. 30, 2018

(30) Foreign Application Priority Data

Sep. 18, 2015   (DE) .................. 10 2015 012 253

(51) Int. Cl.
*F16L 55/04* (2006.01)
*F16F 9/08* (2006.01)
(Continued)

(52) U.S. Cl.
CPC .............. *F16F 9/082* (2013.01); *F15B 1/103* (2013.01); *F16F 9/006* (2013.01);
(Continued)

(58) Field of Classification Search
CPC ......... F16L 55/053; F16F 9/082; F16F 9/006; F15B 1/103
(Continued)

(56) References Cited

U.S. PATENT DOCUMENTS 2,334,708 A * 11/1943 Joy ........................... F16F 9/06
267/121
3,099,189 A * 7/1963 Blondiau ................ B60T 11/26
138/30

(Continued)

FOREIGN PATENT DOCUMENTS

DE      16 25 474        6/1970
DE      24 20 366        11/1974
(Continued)

OTHER PUBLICATIONS

International Search Report (ISR) dated Nov. 18, 2016 in International (PCT) Application No. PCT/EP2016/001389.

*Primary Examiner* — James F Hook
(74) *Attorney, Agent, or Firm* — Wenderoth, Lind & Ponack, L.L.P.

(57) ABSTRACT

A bellows accumulator, in particular a pulsation damper, includes a bellows (3) arranged in an accumulator housing (1) and separating two media chambers (27, 28) from each other. Bellows folds (19) of the bellows can be moved at least partially along the inner wall (35) of the accumulator housing (1). The outside diameter of the bellows folds (19) is selected to be slightly smaller than the associated diameter of the inner wall (35) of the accumulator housing (1) in such a way that spaces (37, 41) are formed, which spaces together form a hydraulic damper for at least one medium.

12 Claims, 3 Drawing Sheets

(51) Int. Cl.
*F15B 1/10* (2006.01)
*F16F 9/00* (2006.01)

(52) U.S. Cl.
CPC . *F15B 2201/205* (2013.01); *F15B 2201/3153* (2013.01); *F15B 2201/3158* (2013.01); *F16F 2224/048* (2013.01); *F16F 2230/0082* (2013.01)

(58) Field of Classification Search
USPC .................................................. 138/30, 31
See application file for complete search history.

(56) References Cited

U.S. PATENT DOCUMENTS

| | | | | |
|---|---|---|---|---|
| 4,819,697 | A * | 4/1989 | Randa | F15B 1/08 |
| | | | | 138/30 |
| 4,858,898 | A * | 8/1989 | Niikura | B60G 15/12 |
| | | | | 267/218 |
| 4,997,009 | A | 3/1991 | Niikura et al. | |
| 9,377,031 | B2 * | 6/2016 | Miyake | F15B 1/103 |
| 2003/0111124 | A1 * | 6/2003 | Gray, Jr. | F16L 55/053 |
| | | | | 138/30 |
| 2010/0084033 | A1 * | 4/2010 | Hummelt | F15B 1/106 |
| | | | | 138/30 |
| 2014/0230939 | A1 * | 8/2014 | Weber | F15B 1/103 |
| | | | | 138/30 |
| 2016/0053933 | A1 * | 2/2016 | Arikawa | F16B 5/08 |
| | | | | 138/30 |
| 2016/0138357 | A1 * | 5/2016 | Bauer | F15B 1/103 |
| | | | | 138/31 |

FOREIGN PATENT DOCUMENTS

| | | |
|---|---|---|
| DE | 39 00 899 | 7/1989 |
| EP | 0 391 320 | 10/1990 |
| JP | 3-134302 | 6/1991 |
| JP | 2000-346001 | 12/2000 |
| WO | 2011/079890 | 7/2011 |

* cited by examiner

BELLOWS ACCUMULATOR, IN PARTICULAR PULSATION DAMPER

FIELD OF THE INVENTION

The invention concerns a bellows accumulator, in particular a pulsation damper, comprising a bellows arranged in an accumulator housing and separating two media chambers from each other. The bellows folds of the bellows can be moved at least partially along the inner wall of the accumulator housing.

BACKGROUND OF THE INVENTION

Bellows accumulators of this kind are prior art, compare for example WO 2011/079890 A1. Such bellows accumulators are preferably used in hydraulic systems as pulsation dampers in order to reduce or dampen pressure spikes that occur in hydraulic fluids. In applications where pressure spikes occur with high frequency and the bellows are subjected to high vibrational loads, the known bellows accumulators are at their limit. In particular in systems where safety is critical, such as hydraulic actuators for wing flaps or stabiliser components in aircraft, the known bellows accumulators are not able to meet the stipulated operational safety requirements.

SUMMARY OF THE INVENTION

Based upon this problem, an object of the invention to provide an improved bellows accumulator that can be used specifically as a pulsation damper and that is characterized by a favourable operating characteristic and by a particularly effective damping effect.

This object is basically met according to the invention by a bellows accumulator having, as a particular feature of the invention, the outer diameter of the bellows folds selected to be slightly smaller than the associable diameter of the inner wall of the accumulator housing in such a way that interspaces are formed and form together a hydraulic damper for at least one medium. With the chosen, small difference in diameter and the correspondingly small width of the gap formed between the outside of the bellows and the inner wall of the housing, a plurality of damping throttles is formed between subsequent fold gaps that correspond to the number of bellows folds. In the instance of a bellows movement, where the volumes of the interspaces change, parts of the medium flows through, which parts are is located inside the gaps and inside the interspaces. Particularly in the instance of pulsations that take place at high frequencies and relatively low amplitudes, such as is the case with hydraulic fluid supplied by screw compressors, hydraulic damping is achieved on the outside of the bellows in addition to the damping caused by the volume changes of the bellows.

In advantageous exemplary embodiments the size of the interspaces to achieve the hydraulic damping effect is chosen such that, under consideration of the medium in the gap, a sliding guide of the bellows folds is achieved in the accumulator housing in the gap between the outer diameter of the bellows and the inner diameter of the housing. A kind of slide bearing is formed by a lubricating film of the medium if the gap is small. Advantageously, a sliding guide of this kind can facilitate a movement of the bellows parallel to the longitudinal axis of the accumulator housing and impedes it in the direction transverse to the longitudinal axis. Whilst the above-described, known solution provides a sleeve that covers the outside of the bellows to protect it from excessive vibrational loads that occur in operation, which sleeve is attached to the moving end of the bellows so as to provide circumferential guidance for the bellows, the sliding guide provided by the invention acts as a hydrostatic slide bearing. This hydrostatic slide bearing provides the bellows with protection against excessive vibrational loads without burdening the bellows with an additional moveable mass, such as the sleeve in the known solution, which ensures an optimal response and damping characteristic at high frequencies.

In advantageous exemplary embodiments the medium space between the outside of the bellows and the associated inside of the bellows housing may contain a medium of high viscosity, such as a phosphoric acid ester oil (HFD-R). The medium on the inside of the bellows may be a process gas such as nitrogen gas. When using these types of media, the bellows accumulator according to the invention is particularly suitable for aeronautical engineering applications where corresponding safety regulations apply for the media used, such as low flammability, cold environment operating limits and such like.

The size or the dimension of the gap respectively may, advantageously, be between 3.0 mm and 0.15 mm, particularly preferred between 2.0 mm for a low hydraulic damping effect and 0.25 mm for an extremely high hydraulic damping effect. With the dimension of the gap chosen in this manner, the gap between the sliding guide of a corresponding bellows fold is transformed into damping spaces at the assignable inner wall of the accumulator housing at least when the bellows is extended. The damping spaces are delimited by two adjacently located bellows folds.

In advantageous exemplary embodiments the height of the bellows in its extended state may be one to one and a half times of the internal diameter.

The bellows may, with particular advantage, be made from a metallic material and/or the ends of the folds may have tapered cross-sections and/or the bellows does not require any additional guiding facilities in the vicinity of its sliding guide inside the accumulator housing.

In a preferred embodiment the one end of the bellows is attached to a moveable end body. The other end of the bellows is secured to a retaining ring that is fixed to the housing.

Particularly advantageously the arrangement may be such that the moveable end body closes the inside of the bellows off with respect to the one medium connection of the accumulator housing, is circular in shape and is provided with protruding guide members for making contact with inner wall parts of the accumulator housing, where media passages extend between the guide members of the end body. Despite the lateral guide provided for the moveable end of the bellows, the fluid connection to the media space between the outside of the bellows and the inside of the accumulator housing remains intact.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
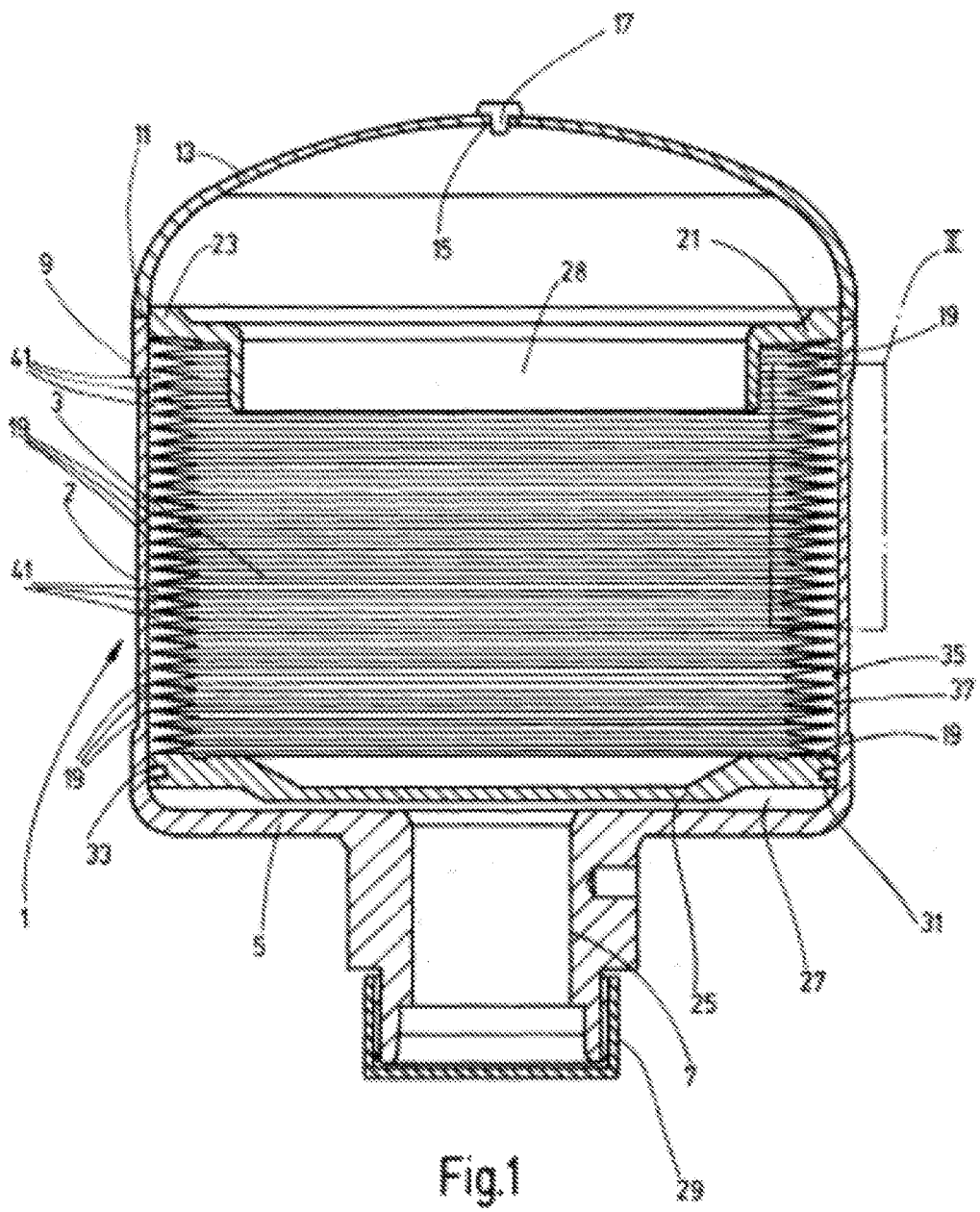
FIG. 1 is a side view in section of a bellows accumulator according to a first exemplary embodiment of the invention, wherein the bellows is shown fully extended.

The invention is now explained with reference to the attached drawings by way of examples of pulsation dampers, which are particularly intended to reduce or dampen pressure spikes, which occur at high frequencies in the hydraulic fluid of the hydraulic system of an aircraft. FIG. 1 depicts an accumulator housing 1 of a first exemplary embodiment comprising a main housing part 2, which may contain the metallic bellows 3. The main housing part 2 is made in the form of a circular-cylindrical pot with a bottom 5, which is closed except for a centrally located fluid connection 7. At the opposite, upper end, as depicted in FIG. 1, the main part 2 is provided with an increased wall thickness 9. Welded to the free end of the upper end is a metallic housing end part 13, along the weld seam 11. The housing end part 13 has the form of a domed cup, which is closed apart from a centrally located filling opening 15, which is closed by a weld nugget 17.

The metallic bellows 3 that is located inside the main part 2 is welded at its open bellows end, shown at the top in FIG. 1, with its last bellows fold 19 to a metallic retaining ring 21. Retaining ring 21 is provided with a thickened circumferential edge 23 with which it is secured to the accumulator housing 1 in such a manner that the thickened circumferential edge 23 overlaps the weld seam 11 between main part 2 and end part 13. The welding method used is a full penetration welding process using electron-beam welding (laser welding) so that the circumferential edge 23 of the retaining ring 21 is also welded on. The opposite, lower end of the bellows 3 is closed by a metallic, plate-shaped bottom part 25 to which the lowest bellows fold 19 is welded.

FIG. 1 depicts the operational state in which the bellows 3 is fully extended and the oil end 27 is empty. The associated fluid connection 7 is closed with a protective screw cap 29. When used in aeronautical engineering systems, the bellows 3 forms the moveable separation element between a viscous hydraulic fluid on the oil side 27, such as a phosphoric acid ester oil (HFD-R), which, as a low-flammability liquid, is permitted for aeronautical applications, and a process medium, such as a process gas, such as nitrogen gas, which is present on the gas side 28 of the accumulator housing 1 under a pre-filing pressure. The gas side 28 is formed by the inner space of the bellows 3 as well as the housing part located above the retaining ring 21.

Figure 2:
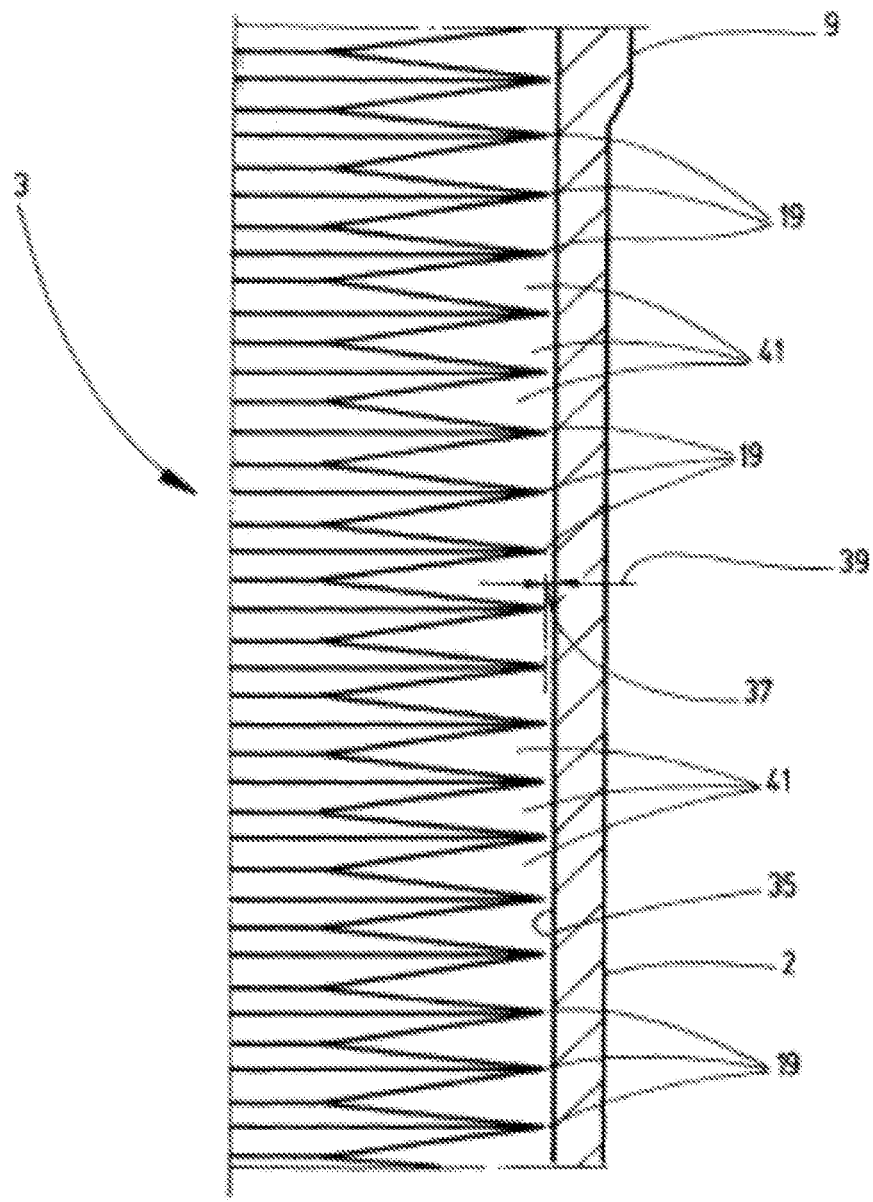
FIG. 2 is an enlarged, partial side view in section of the section marked with II in FIG. 1.
Figure 3:
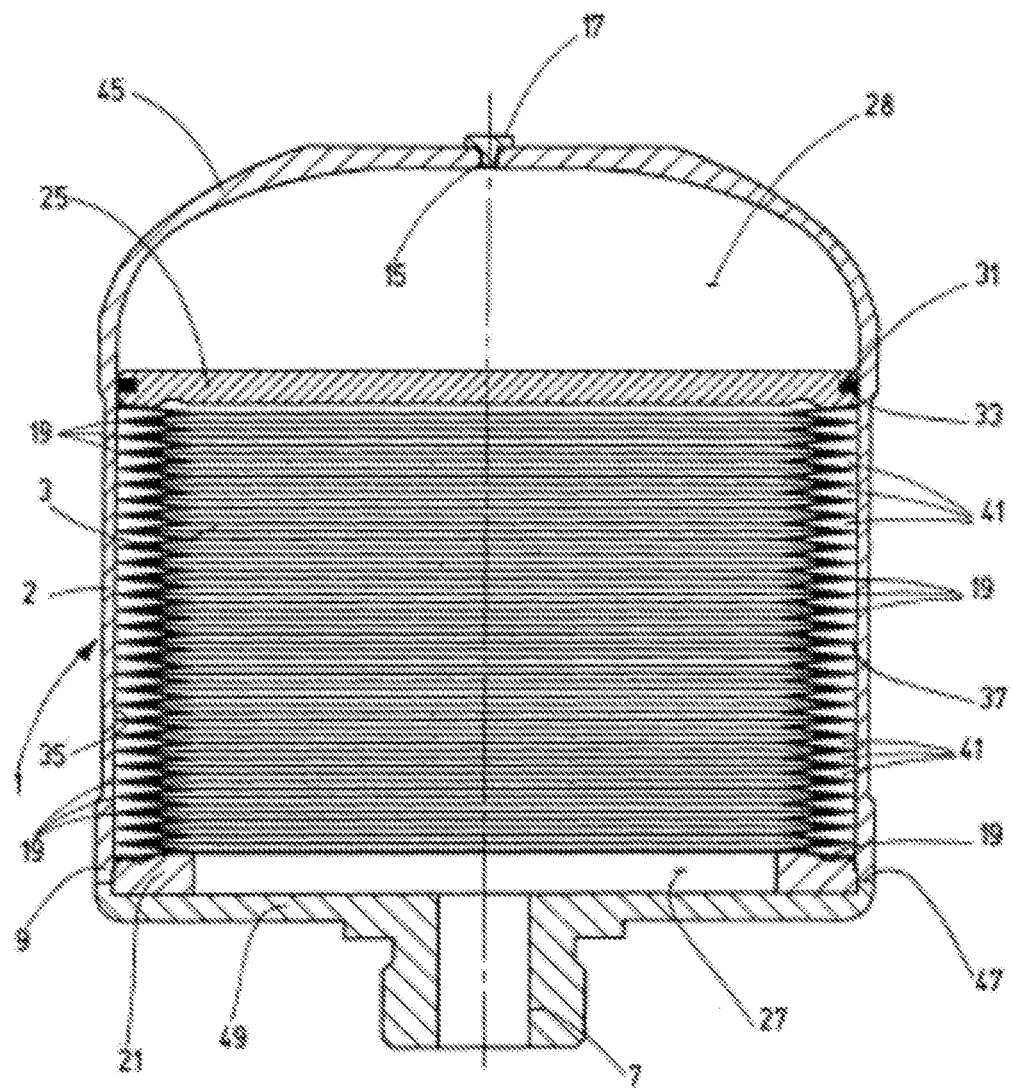
FIG. 3 is a side view in section of a bellows accumulator according to a second exemplary embodiment of the invention with a fully extended bellows.

To facilitate the guidance of the axial movements of the bottom part 25, which changes the volume of the bellows, the bottom part 25 is guided by a guide ring 33 disposed on its circumferential edge 31. Guide ring 33 is made from a synthetic material with good sliding properties, for example tetrafluoroethylene. In order to facilitate the passage of fluid from the oil side 27 that is adjacent to the fluid connection 7 to the outside of the bellows 3 despite the axial guide provided by the guide ring 33, so that also the area of the gap 37 between the outside of the bellows and the inner wall of the housing 35 is part of the oil side 27, the guide ring 33 has the shape of a flat ring that is formed in such a manner as is shown for a guide ring that fulfils a comparable function that is depicted in FIGS. 2 and 3 of the document WO 2011/079890 A1 and referenced with the number 47, cited above as prior art. In accordance with that the guide ring 33 is provided with circumferentially spaced, radially protruding guide sections that are in contact with the inner housing wall 35 and between which are radially recessed gaps that allow the fluid to pass through.

As is most clearly shown in FIG. 2, a gap 37 is provided between the inner wall 35 of the main part 2 of the accumulator housing 1 and the outer diameter of bellows 3 that is established by the tips of the bellows folds 19. The width of this gap is indicated in FIG. 2 by the arrows 39. In conjunction with the interspaces 41, which are formed between its folds 19 by an at least not fully compressed bellows 3, the volumes of which change accordingly with the movement of the bellows in operation, damping spaces are formed between the outside of the bellows and the inner housing wall 35 as part of the oil side 27. As is apparent from FIG. 2, damping throttles are formed between the tips of the folds 19 and the inner housing wall 35 for the fluid flow that results from the volume changes of the fold interspaces 41 caused by the bellows movement in operation. The chosen gap size determines the throttle cross-section. In addition to the pulsation damping effect due to the movement of the bellows against the pressure cushion of the process gas, a hydraulic damping effect is achieved on the outside of the bellows. For reasons of clarity the folds 19 and the interspaces 41 between the folds 19 are not all marked as such in FIGS. 1 and 2.

The size of the gap may be selected depending on the desired damping effect; for example a gap of 2.0 mm for a relatively low damping effect or of 0.25 mm for a high damping effect. With such small gap sizes and a highly viscous medium on the oil side 27, such as phosphoric acid ester oil, a lubricating film is formed between the inner housing wall 35 and the outside of the bellows 3. The lubricating film acts as axial guidance for the bellows folds 19 inside the housing 1 and provides protection for the folds 19 with respect to vibrational loads. The bellows accumulator according to the invention is then particularly suitable as a damping device for fluids with high-frequency pressure spikes. The invention is also suitable for use in high-frequency pulsation applications because it is not necessary to attach an additional oscillating mass to bellows 3 for the guidance of the bellows folds 19, as it is necessary in the above-described, known solution that provides a sleeve on the bellows that surrounds the folds.

FIG. 3 depicts a modified or second exemplary embodiment in which the accumulator housing 1 is closed at the upper end of the circular-cylindrical main part 2 through a domed cover part 45 that is connected to main part 2. The lower end of main part 2 is closed along the weld seam 47 by a flat housing bottom 49, which corresponds to the bottom 5 of the first exemplary embodiment and which, in likewise manner, is provided with a central filling connection 7 for the hydraulic fluid. The metallic bellows 3 in this exemplary embodiment is open towards the bottom 49 so that the inside of the bellows 3 forms the oil side 27. The retaining ring 21, which is welded to the last bellows fold 19 at the open end of the bellows 3, is formed in this exemplary embodiment by a flat ring, which is fixed along the weld seam 47 to the lower end of the main housing part 2.

As in the first exemplary embodiment, the bottom part 25, which forms the closed end of the bellows 3 and which is welded to the last bellows fold 19 that faces it, is axially moveable. Again, as in the first exemplary embodiment, the bottom part 25 is fitted at the circumferential edge 31 with the guide ring 33 that is provided with passages so that the gap 37, which is formed, like in the first exemplary embodiment, between the inner housing wall 35. The outside of the bellows 3, in FIG. 2 is indicated by the gap dimension 39, forms together with the interspaces 41 between the folds 19 damping spaces. Damping throttles formed between the tips of the folds 19 and the inner wall 35 for the flow of process gas when the bellows 3 moves, causing volume changes of the interspaces 41. As in the first exemplary embodiment, this causes on the outside of the bellows 3 an additional damping effect. As in FIGS. 1 and 2, the folds 19 and the interspaces 41 between the folds 19 shown in FIG. 3 are not all marked as such for reasons of clarity.

While various embodiments have been chosen to illustrate the invention, it will be understood by those skilled in the art that various changes and modifications can be made therein without departing from the scope of the invention as defined in the claims.

The invention claimed is:

1. A bellows accumulator comprising:
an accumulator housing having first and second media chambers therein; and
a bellows inside said accumulator housing separating said first and second media chambers from each other, said bellows having bellows folds movable at least partially along an inner wall of said accumulator housing, said bellows folds having an outer diameter slightly smaller than an inner diameter of an inner wall of said accumulator housing with interspaces being formed between said bellows folds and said inner wall forming a hydraulic damper for medium in at least one of said first and second media chambers, said interspaces having a size achieving a damping effect with medium being in a gap between outer free ends of said bellows folds and said inner wall of said accumulator housing and forming a sliding guide of said bellows folds in said gap, said gap has a gap width being between 3.0 mm and 0.15 mm in a radial direction transverse to a longitudinal axis of said bellows, said bellows having a length along said longitudinal axis of 1.0 to 1.5 times an internal diameter thereof in an extended state of said bellows, said outer free ends and inner free ends of said bellows folds being tapered in cross section radially outwardly and inwardly, respectively.

2. A bellows accumulator according to claim 1 wherein said sliding guide facilitates movement of said bellows parallel to said longitudinal axis and impedes movement of said bellows transverse to said longitudinal axis.

3. A bellows accumulator according to claim 2 wherein said gap between said sliding guide and a corresponding bellows fold transforms into damping spaces at said inner wall of said accumulator housing at least when said bellows is extended, each of said damping spaces being delimited by said bellows folds located adjacent one another.

4. A bellows accumulator according to claim 2 wherein no additional guides for said bellows are in a vicinity of said sliding guide inside said accumulator housing.

5. A bellows accumulator according to claim 1 wherein medium spaces between a radial outside surface of said bellows and said inner wall of said accumulator housing contains a liquid of high viscosity; and
an interior of said bellows contains a gas.

6. A bellows accumulator according to claim 5 wherein said liquid is phosphoric acid ester oil.

7. A bellows accumulator according to claim 6 wherein said gas is nitrogen gas.

8. A bellows accumulator according to claim 5 wherein said gas is nitrogen gas.

9. A bellows accumulator according to claim 1 wherein said gap width is between 2.0 mm and 0.15 mm.

10. A bellows accumulator according to claim 1 wherein said bellows is made of metallic material.

11. A bellows accumulator according to claim 1 wherein a moveable end body is attached to a first axial end of said bellows; and
a second axial end of said bellows is secured to a retaining ring fixed to said accumulator housing, said second axial end being opposite said first axial end.

12. A bellows accumulator according to claim 11 wherein said moveable end body closes an inside of said bellows relative to a medium connection in said accumulator housing, has a circular shape and has protruding guide members contacting inner wall parts of said housing with media passages extending between said guide members of said moveable end body.

* * * * *